(12) United States Patent
Patil et al.

(10) Patent No.: US 10,808,655 B2
(45) Date of Patent: Oct. 20, 2020

(54) CHARGE FLOW INTRODUCER

(71) Applicant: Cummins Inc., Columbus, IN (US)

(72) Inventors: Sandesh R. Patil, Pune (IN); Joshua Bradley Bettis, Columbus, IN (US); Yogesh Jagannath Patil, Nandurbar (IN)

(73) Assignee: Cummins Inc., Columbus, IN (US)

( * ) Notice: Subject to any disclaimer, the term of this patent is extended or adjusted under 35 U.S.C. 154(b) by 0 days.

(21) Appl. No.: 16/260,417

(22) Filed: Jan. 29, 2019

(65) Prior Publication Data

US 2019/0203680 A1 Jul. 4, 2019

Related U.S. Application Data

(63) Continuation of application No. PCT/US2016/044716, filed on Jul. 29, 2016.

(51) Int. Cl.
| | |
|---|---|
| F02M 35/10 | (2006.01) |
| F02M 25/06 | (2016.01) |
| F02M 21/04 | (2006.01) |
| F02B 37/16 | (2006.01) |
| F01M 13/00 | (2006.01) |
| F02B 29/04 | (2006.01) |

(52) U.S. Cl.
CPC ...... *F02M 35/10222* (2013.01); *F01M 13/00* (2013.01); *F02B 29/0406* (2013.01); *F02B 37/16* (2013.01); *F02B 37/162* (2019.05); *F02M 21/047* (2013.01); *F02M 25/06* (2013.01); *F02M 35/10373* (2013.01); *F02M 21/04* (2013.01); *Y02T 10/121* (2013.01); *Y02T 10/144* (2013.01); *Y02T 10/32* (2013.01)

(58) Field of Classification Search
USPC ......................................... 60/605.1
See application file for complete search history.

(56) References Cited

U.S. PATENT DOCUMENTS

| | | | |
|---|---|---|---|
| 3,680,534 A * | 8/1972 | Chavant | F02M 26/19 123/568.17 |
| 4,069,796 A | 1/1978 | Baisley | |
| 4,345,573 A | 8/1982 | Obata | |
| 6,267,106 B1 | 7/2001 | Feucht | |
| 6,722,129 B2 | 4/2004 | Griddle et al. | |
| 6,810,867 B2 | 11/2004 | Schmid et al. | |
| 7,243,641 B2 | 7/2007 | Zukouski | |
| 7,624,575 B2 | 12/2009 | Noelle et al. | |
| 7,721,542 B2 | 5/2010 | Chen | |
| 8,322,138 B2 | 12/2012 | Jackson | |
| 8,449,558 B2 | 8/2013 | Muenz | |
| 9,347,368 B2 | 5/2016 | Ulrey et al. | |
| 2011/0182714 A1 * | 7/2011 | Naunheim | F01D 17/105 415/148 |
| 2013/0283788 A1 | 10/2013 | Kobayashi | |

(Continued)

OTHER PUBLICATIONS

International Search Report and Written Opinion, PCT Appln. No. PCT/US16/44716, dated Oct. 20, 2016, 17 pgs.

*Primary Examiner* — Jesse S Bogue
*Assistant Examiner* — Loren C Edwards
(74) *Attorney, Agent, or Firm* — Taft Stettinius & Hollister LLP

(57) ABSTRACT

Methods and devices are disclosed for introducing a fresh airflow, crankcase ventilation gases, fuel, and charge bypass flow upstream of a pressure source of an internal combustion engine.

27 Claims, 7 Drawing Sheets

(56) References Cited

U.S. PATENT DOCUMENTS

| | | |
|---|---|---|
| 2014/0010631 A1 | 1/2014 | Khedekar |
| 2014/0116399 A1* | 5/2014 | Ulrey .................... F02M 25/08 |
| | | 123/520 |
| 2014/0224232 A1* | 8/2014 | Hotta ..................... F02B 37/16 |
| | | 123/574 |
| 2015/0082875 A1* | 3/2015 | Beyrich ........... F02M 35/10242 |
| | | 73/114.32 |
| 2015/0114350 A1 | 4/2015 | Pursifull |
| 2016/0186694 A1 | 6/2016 | Wakamatsu et al. |
| 2017/0138319 A1* | 5/2017 | Zurlo .................... F02M 25/06 |

* cited by examiner

CHARGE FLOW INTRODUCER

CROSS-REFERENCE TO RELATED APPLICATION

The present application is a continuation of International Patent Application No. PCT/US16/44716 filed on Jul. 29, 2016, which is incorporated herein by reference in its entirety.

FIELD OF THE INVENTION

The present invention relates generally to internal combustion engines, and more particularly to systems, devices and methods for introducing a charge flow, such as by introducing a combined fuel flow, closed crankcase ventilation gases, and charge bypass flow, upstream of an internal combustion engine.

BACKGROUND

Some internal combustion engines include turbochargers with a compressor to compress intake air. Fuel can be added upstream of the compressor for compression and mixing with the intake flow. In addition, some compressors include a bypass in which excess or rejected compressed intake air from the downstream system and fuel (charge bypass (CBP) flow) are returned from downstream of the compressor to upstream of the compressor. Other systems return high pressure combustion gases that escape between the pistons and cylinders (also known as blow-by or closed crankcase ventilation (CCV) gases) upstream of the compressor to prevent the release of these gases to atmosphere. However, present systems separately return CCV gases, fuel flow and CBP flow so that engine performance and transient response are negatively impacted. In addition, current introducers for fuel and CBP flow can be bulky and expensive to manufacture and implement. Therefore, further improvements in this technology area are needed.

SUMMARY

One embodiment is a unique system, method and/or apparatus for introducing a charge flow including, for example, fresh airflow, CCV gases, fuel flow, and CBP flow at or upstream of an internal combustion engine and/or at an inlet to a pressure source, such as a compressor of an engine turbocharger. In a specific embodiment, the apparatus is an introducer that receives an axial fresh airflow and includes a first inlet for CCV gases, a second inlet for fuel flow, and a third inlet for CBP flow.

In another embodiment, a charge flow introducer is provided that maintains components of the charge flow at predetermined cross-sectional peripheral areas in the introducer to avoid compressor wheel stresses caused by a density of a mixed charge flow.

This summary is not intended to identify key or essential features of the claimed subject matter, nor is it intended to be used as an aid in limiting the scope of the claimed subject matter. Further embodiments, forms, objects, features, advantages, aspects, and benefits shall become apparent from the following description and drawings.

BRIEF DESCRIPTION OF THE DRAWINGS

The description herein makes reference to the accompanying drawings wherein like numerals refer to like parts throughout the several views, and wherein.

DESCRIPTION OF THE ILLUSTRATIVE EMBODIMENTS

Figure 1:
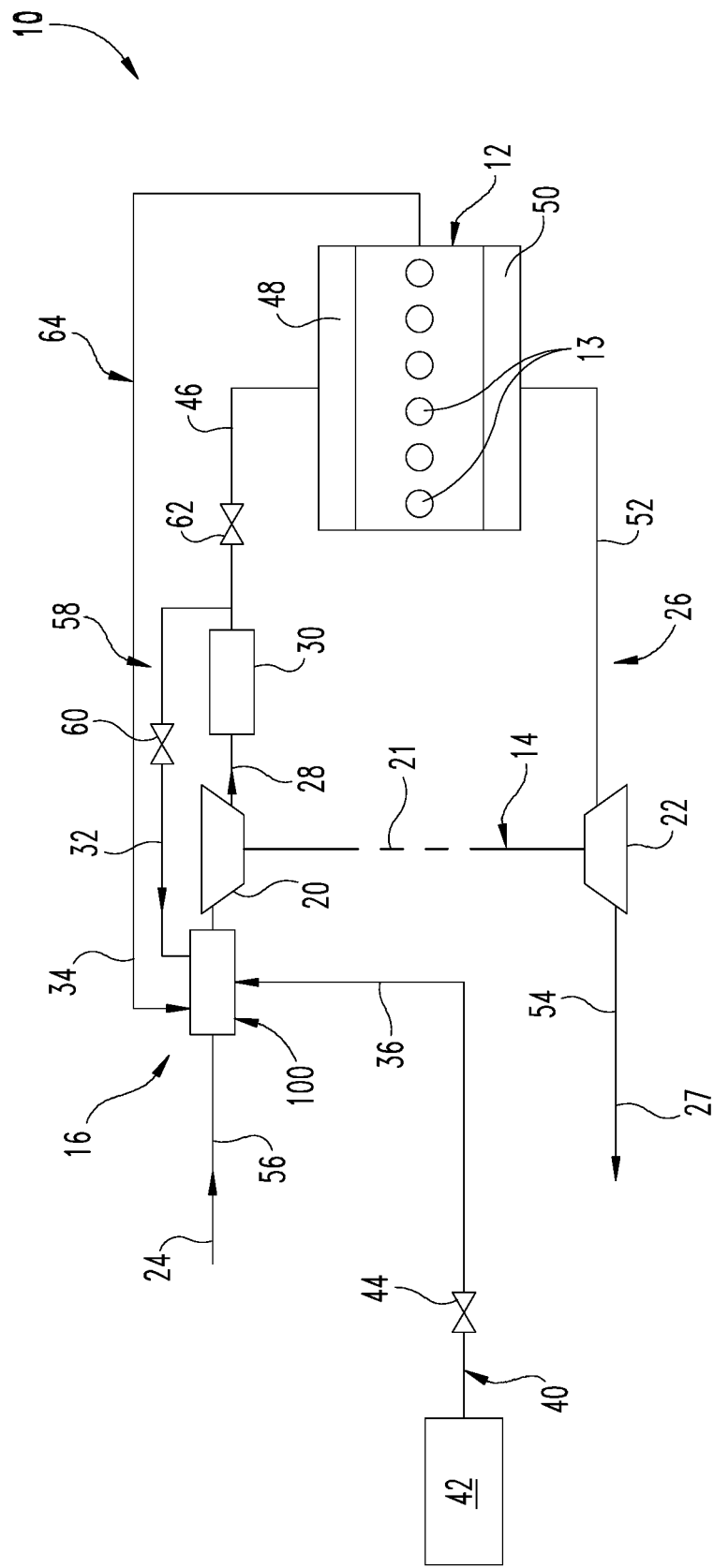
FIG. 1 is a schematic block diagram of one embodiment of an internal combustion engine and turbocharger system.
Figure 2:
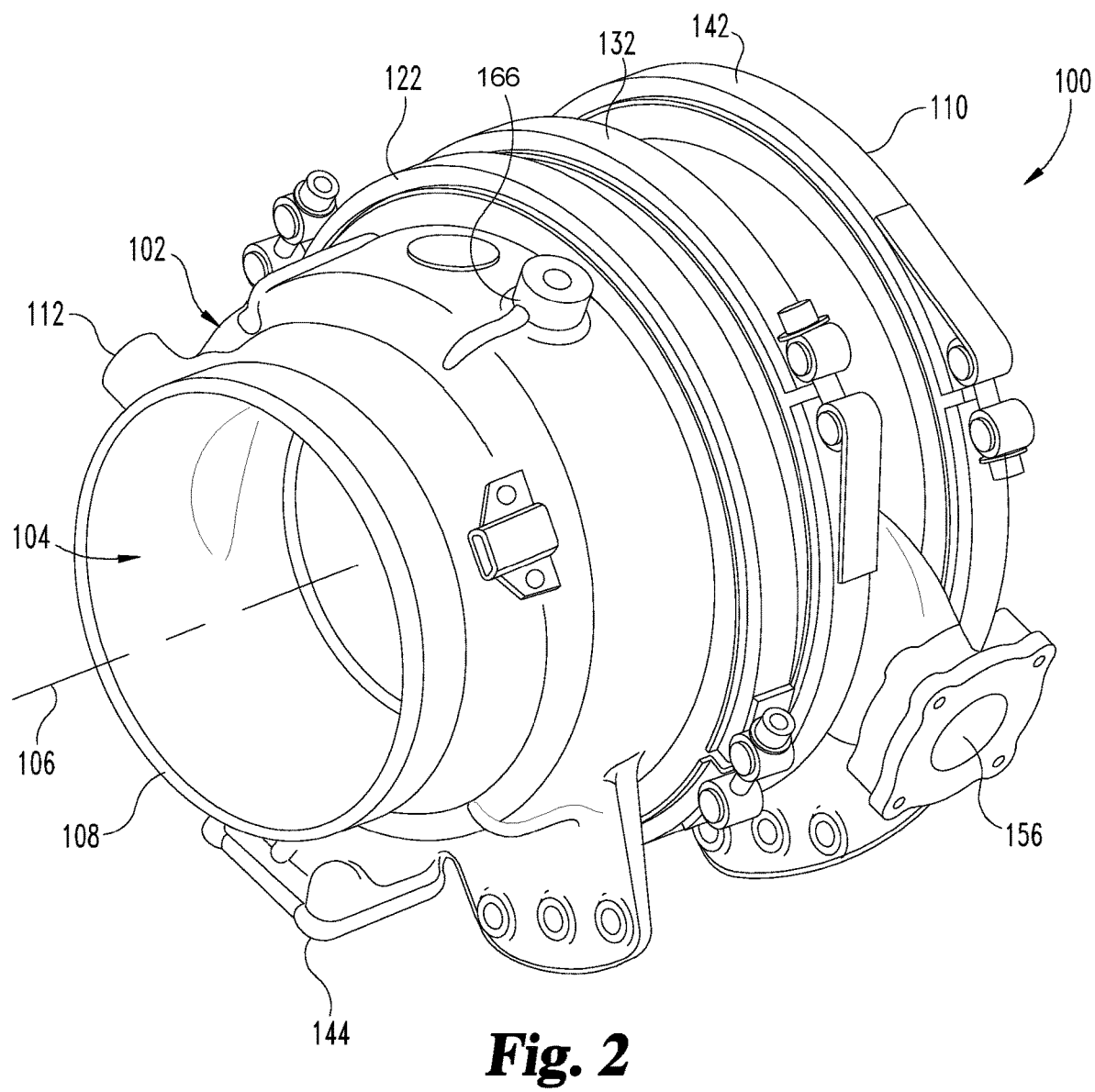
FIG. 2 is a perspective view of an introducer mountable to an inlet of a compressor of the turbocharger system of FIG. 1.
Figure 3:
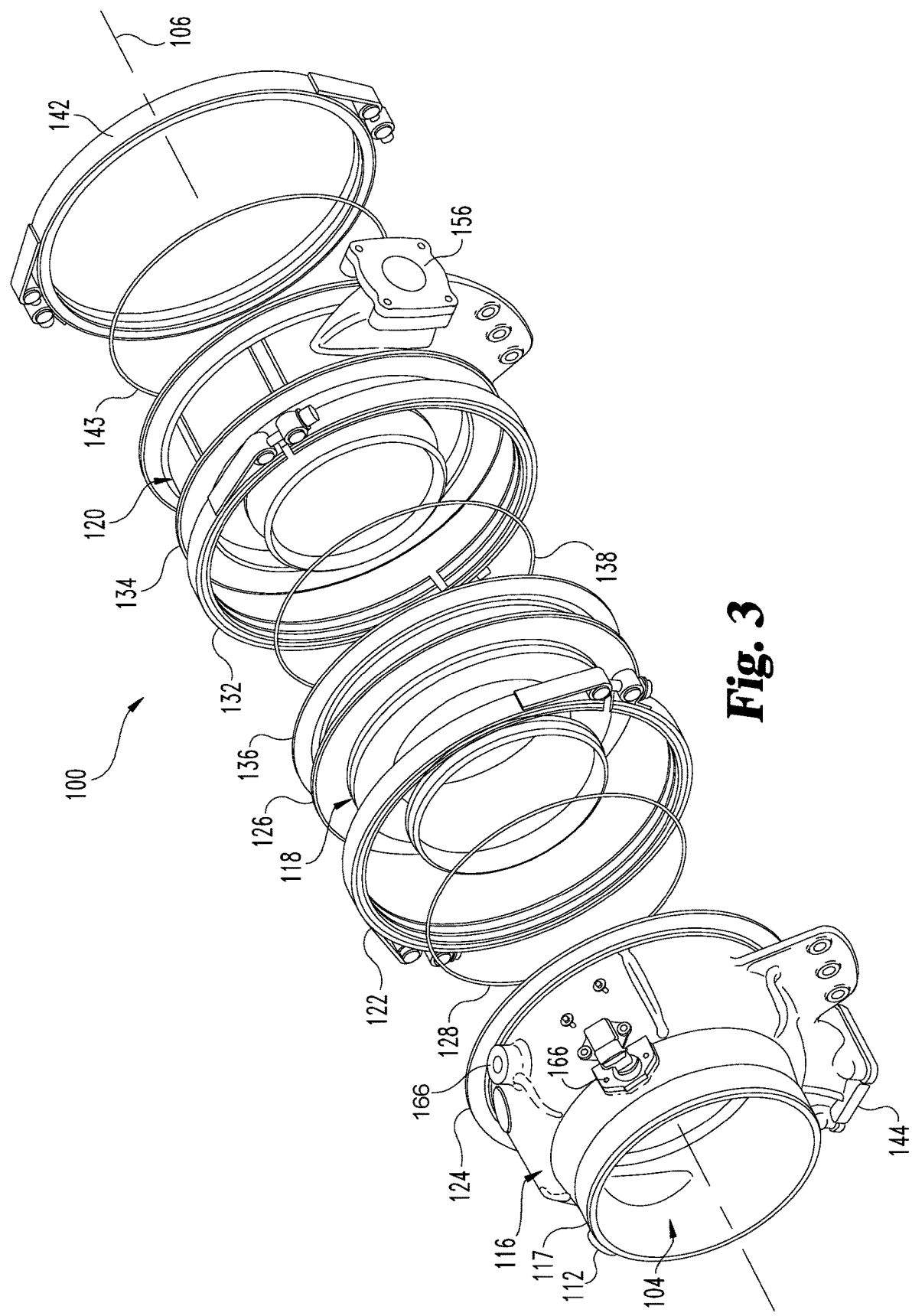
FIG. 3 is an exploded perspective view of the introducer of FIG. 2.
Figure 4:
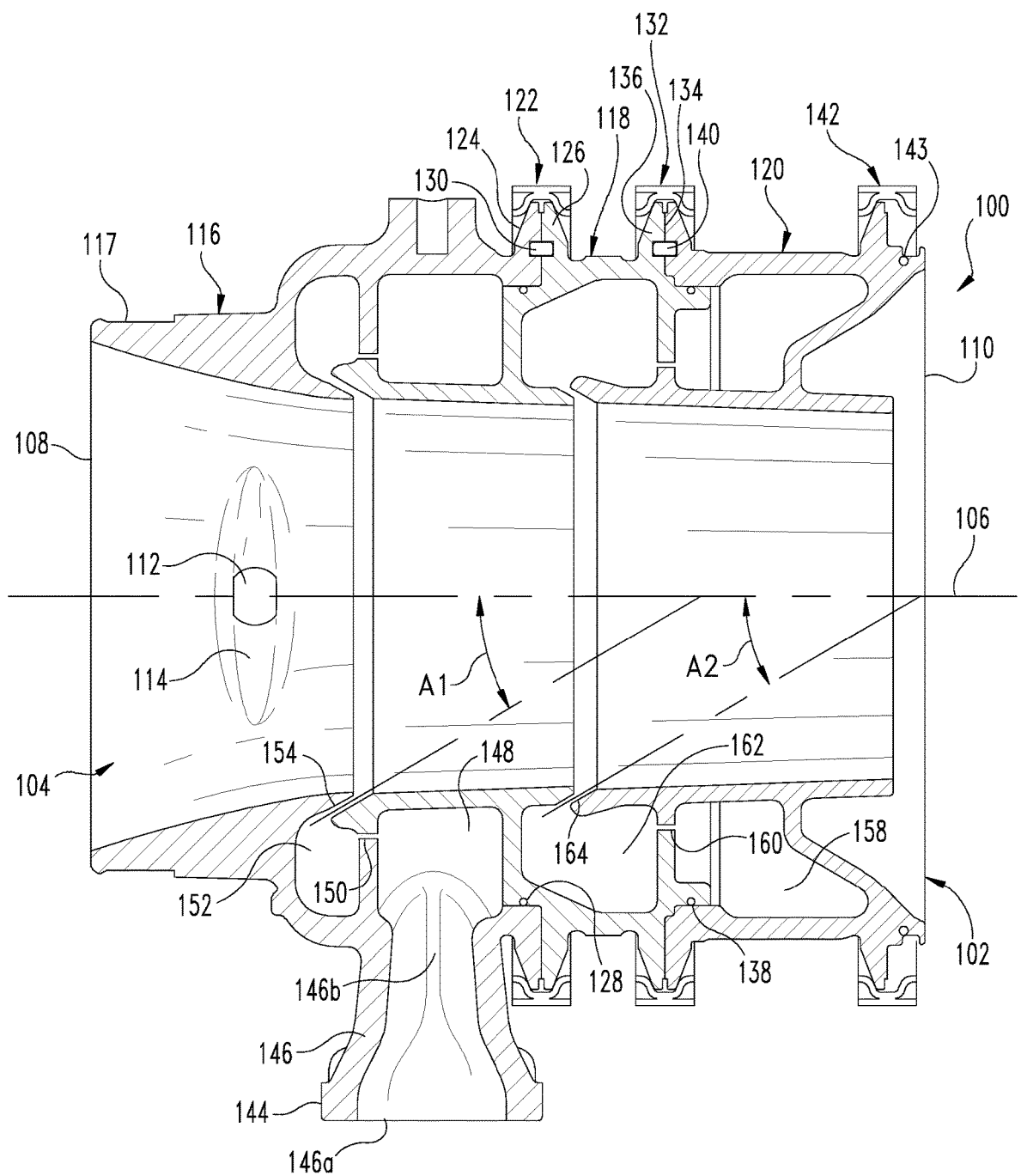
FIG. 4 is a section view of the introducer of FIG. 2 along the intake airflow axis of the introducer.

For the purposes of promoting an understanding of the principles of the invention, reference will now be made to the embodiments illustrated in the drawings and specific language will be used to describe the same. It will nevertheless be understood that no limitation of the scope of the invention is thereby intended, any alterations and further modifications in the illustrated embodiments, and any further applications of the principles of the invention as illustrated therein as would normally occur to one skilled in the art to which the invention relates are contemplated herein.

FIG. 1 is a schematic block diagram of one embodiment of a system 10 for a vehicle with an internal combustion engine 12 and at least one turbocharger 14. Embodiments also contemplate multiple turbochargers. The system 10 includes an air intake assembly 16 to provide a source of intake fresh airflow 24 to engine 12 and to a pressure source such as compressor 20 of turbocharger 14. The turbocharger 14 also includes a turbine 22 connected compressor 20 with a shaft 21, and also to exhaust system 26 to drive compressor 20 with exhaust flow 27. The compressor 20 receives intake fresh airflow 24 and outlets a pressurized charge flow 28 to engine 12. In the illustrated embodiment, the pressure source is compressor 20 of turbocharger 14, however, in other embodiments the pressure source can be a positive displacement supercharger, a dynamic compression supercharger, and/or any other device capable of receiving and outputting the charge flow 28 with increased pressure.

At the inlet on an upstream side of compressor 20, an introducer 100 receives intake fresh airflow 24, a charge bypass flow 32, crankcase ventilation gas flow 34, and a fuel flow 36. Introducer 100 mixes fresh airflow 24, charge bypass flow 32, CCV gases 34, and fuel flow 36 to provide a charge flow to compressor 20 for compression to provide a compressed charge flow 28 to engine 12.

Furthermore, the compressor 20 can be in flow communication with an intercooler or charge air cooler 30 between compressor 20 and the engine 12. In certain embodiments, the air intake assembly 16 may include a number of features not shown in FIG. 1, including an air filter, noise reduction and flow altering devices, such as, but not limited to, baffles. In another example, a flow meter, such as mass airflow sensor (MAF), can be disposed upstream of the compressor 20, such as at or near a compressor inlet. In addition, one or more sensors that measure temperature, humidity, pressure, pressure change, can be disposed at or near the compressor inlet. The intake air assembly 16 may or may not include a charge air cooler, mass airflow sensor, and/or second stage turbochargers.

The engine 12 includes cylinders 13 connected to the intake air assembly 16 to receive at least a portion of the charge flow 28. Cylinders 13 are connected to exhaust system 26 to release exhaust gases produced by combustion of the charge flow 28 in the cylinders 13. Exhaust system 26 may provide exhaust gases to turbocharger 14. It is also contemplated that multiple turbochargers can be included to provide high pressure and low pressure turbocharging stages that compress the intake flow.

In the illustrated embodiment, the engine 12 includes six cylinders 13 in an in-line arrangement. However, the number of cylinders 13 may be any number, and the arrangement of cylinders 13 may be any arrangement, including V-shaped, and is not limited to the number and arrangement shown in FIG. 1. The system 10 can further include an exhaust gas recirculation system (not shown) which recirculates a portion of exhaust flow 27 that mixes with the intake system 16 upstream and/or downstream of turbocharger 14.

The internal combustion engine 12 can be a diesel engine, a gasoline engine, a dual fuel engine, or any other type of internal combustion engine 12. In certain embodiments, the engine 12 can be a spark-ignited engine that uses a gaseous fuel such as, for example, natural gas, bio-gas, commercially available gas, methane, ethane, propane (LPG), butane, ethanol, producer gas, field gas, nominally treated field gas, well gas, nominally treated well gas, liquefied natural gas (LNG), compressed natural gas, landfill gas, condensate, coal-bed methane (CBM), liquid fuels that are readily vaporized (such as gasoline), and mixtures of these. However, other types of fuels are not precluded, such as any suitable liquid fuel and gaseous fuel. In other embodiments, engine 12 includes a lean combustion engine such as a diesel cycle engine that also uses a liquid fuel such as diesel fuel.

System 10 further includes a fuel system 40 that provides fuel flow 36 to introducer 100. Fuel system 40 can include a fuel source 42 that can be a fuel tank, a well, pipeline, pressurized, non-pressurized, or with reduced pressure. Fuel system 40 can also include a pump (not shown) and one or more control valves 44 to control fuel flow 36 to introducer 100.

Air intake system 16 includes one or more inlet supply conduits 46 connected to an engine intake manifold 48 and flow coupled to compressor 20. Engine intake manifold 48 distributes the charge flow 28 to cylinders 13 of engine 12. Exhaust system 26 is also coupled to engine 12 with an engine exhaust manifold 50. Exhaust system 26 may include an exhaust conduit 52 extending from exhaust manifold 50 to turbine 22 of turbocharger 14. Turbine 22 may include a valve such as controllable wastegate or other suitable bypass that is operable to selectively bypass at least a portion of the exhaust flow from turbine 22 to reduce boost pressure, charge flow and engine torque under certain operating conditions. In another embodiment, turbine 22 is a variable geometry turbine with a size-controllable inlet opening. While specific examples have been discussed, no particular form of intake or exhaust control valving is required, nor is the use of the same precluded.

An aftertreatment system (not shown) can be connected with an outlet conduit 54 of exhaust system 26. The aftertreatment system may include, for example, oxidation devices (DOC), particulate removing devices (DPF, CDPF), constituent absorbers or reducers (SCR, AMOX, LNT), reductant systems, and other components if desired.

Compressor 20 receives fresh airflow 24 from intake air supply conduit 56. Fuel source 42 may also be flow coupled to introducer 100 at or upstream of the inlet to compressor 20. Intake air system 16 may further include a compressor bypass 58 that connects a downstream or outlet side of compressor 20 to introducer 100 at an upstream or inlet side of compressor 20. Compressor bypass 58 includes a control valve 60 that is selectively opened and closed to allow charge bypass flow 32 to be returned to the inlet side of compressor 20 to reduce compressor surge under certain operating conditions, such as when an intake throttle 62 is closed. System 10 may further include a crankcase ventilation system 64 connected to engine 12 to return blow-by or crankcase ventilation gases to introducer 100.

Inlet supply conduit 46 may include charge air cooler 30 downstream from compressor 20 and upstream of compressor bypass 58. In another embodiment, a charge air cooler is located in the air intake system 16 downstream of intake throttle 62. Charge air cooler 30 may be disposed within inlet air supply conduit 46 between engine 12 and compressor 20, and embody, for example, an air-to-air heat exchanger, an air-to-liquid heat exchanger, or a combination of both to facilitate the transfer of thermal energy to or from the flow directed to engine 12. The arrangement can differ for a V-shaped engine where each cylinder bank is connected to an inlet supply conduit that includes a turbocharger and/or throttle downstream of a charge air cooler. Multiple throttle valves can also be provided in the inlet supply conduit downstream and/or upstream of the charge air cooler.

The fresh airflow 24 or combined flows can be filtered, unfiltered, and/or conditioned in any known manner, either before or after entry into introducer 100. The intake air system 16 may include components configured to facilitate or control introduction of the charge flow 28 to engine 12, and may include intake throttle 62, one or more compressors 20, and charge air cooler 30. The intake throttle 62 may be connected upstream or downstream of compressor 20 via inlet supply conduit 46 and configured to regulate a flow of fresh airflow 24 and/or charge flow 28 to engine 12. Compressor 20 may be a fixed or variable geometry compressor configured to receive air or air and fuel mixture from fuel source 42 and compress the air or combined flow to a predetermined pressure level before engine 12. The charge flow 28 is pressurized with compressor 20 and sent through charge air cooler 30 and supplied to engine 12 through throttle valve 62 and intake supply conduit 46 to engine intake manifold 48.

Referring to FIGS. 2-5, one embodiment of introducer 100 is shown that is mountable to the inlet side of compressor 20. Introducer 100 includes a cylindrical body 102 that defines an axial flow passage 104 extending along longitudinal axis 106 between an upstream end 108 and an opposite downstream end 110. Fresh airflow 24 is received at upstream end 108 of body 102. Body 102 also includes three inlets spaced along longitudinal axis 106 for CCV gas flow 34, fuel flow 36, and charge bypass flow 32, respectively. Charge flow 28 is delivered from introducer 100 at its downstream end 110 to a pressure source such as compressor 20.

A first inlet 112 for CCV gases 34 is provided that extends through body 102 and opens into flow passage 104 at a recessed opening 114 formed in an inner wall surface of body 102. First inlet 112 is connected to crankcase ventilation system 64. The recessed opening 114 is elongated to form an elliptical shaped extending circumferentially around part of flow passage 104 to better distribute CCV gases in flow passage 104. In the illustrated embodiment, body 102 of introducer is formed by an upstream body portion 116, a middle body portion 118, and a downstream body portion 120 positioned in end-to-end axially abutting relation to one another. First inlet 112 is provided in upstream body portion 116. Upstream body portion 116 can also include an outer circumferential surface portion 117 that is recessed to form a hose barb for connection to intake plumbing.

Upstream body portion 116 is joined to middle portion 118 with a first V-band clamp assembly 122 that connects and clamps abutting flange members 124, 126 with an O-ring seal 128 between body portions 116, 118. A first dowel pin set 130 can further be provided to connect body portions 116, 118 in the correct or desired orientation relative to one another.

Downstream body portion 120 is joined to middle body portion 118 with a second V-band clamp assembly 132 that connects and clamps abutting flange members 134, 136 with an O-ring seal 138 between body portions 118, 120. A second dowel pin set 140 can further be provided to connect body portions 120, 118 in the correct or desired orientation relative to one another. A third V-band clamp assembly 142 and O-ring 143 can be provided to mount downstream body portion 120 directly to an inlet of compressor 20. It is contemplated that V-band clamp assemblies are not required, and body portions can be joined to one another by any one or combination of a sealingly tight fit with a sealing member, a friction fit, fasteners, clamps, bolts, screws, weld, or other retention device or method.

A second inlet 144 for fuel flow 36 is provided that extends outwardly from upstream body portion 116 for connection with fuel source 42. Second inlet 144 includes a tapered body 146 that opens into a first fuel storage volume 148 that is defined by the cooperative engagement and interface between body portions 116, 118. Tapered body portion 146 defines a circular bore 146a at its outer end that transitions to an elliptical bore 146b at its inner end. Elliptical bore 146b is elongated circumferentially around a portion of first storage volume 148 to better distribute fuel therein. The body 146 may include a flanged connection, a hose connection, or flexible connection for fuel entry.

The cooperative engagement and interface between body portions 116, 118 further defines a first fuel flow path 150 and a second fuel storage volume 152 that is in flow communication with first fuel storage volume 148 through the first fuel flow path 150. First fuel flow path 150 parallels longitudinal axis 106 and extends upstream from first fuel storage volume 148 to second fuel storage volume 152. Second fuel storage volume 152 opens into flow passage 104 through a second fuel flow path 154. In the illustrated embodiment, second fuel flow path 154 extends in the downstream direction at an angle A1 with respect to longitudinal axis 106.

In one embodiment, the cooperative arrangement between body portions 116, 118 is formed by overlapping parts of body portions 116, 118. For example, referring to FIG. 5 specifically, upstream body portion 116 includes an entry part 116a that has a radially inwardly tapered or bell-mouthed shaped inner surface along flow passage 104 and a downstream part 102b that is radially outwardly positioned from entry part 102a. Middle body portion 118 includes a flange part 118a that includes flanges 126 and 136 projecting radially outwardly therefrom, and an upstream axially extending wall part 118b at an end of first radial wall part 118c. Upstream axially extending wall part 118b is spaced radially inwardly from flange part 118a. Wall part 118b extends axially to an upstream end that defines second fuel flow path 154 in cooperation with entry part 116a. Wall part 118b and first radial wall part 118c further cooperate with downstream part 116b and its radially inwardly extending parts 116c, 116d to define the first and second fuel storage volumes 148, 152.

Referring back to FIGS. 2-5, a third inlet 156 for receiving charge bypass flow 32 is provided that extends outwardly from downstream body portion 120. Third inlet 156 opens into a first charge bypass storage volume 158 that is defined by the cooperative engagement and interface between body portions 118, 120. The cooperative engagement and interface between body portions 118, 120 further defines a first charge bypass flow path 160 and a second charge bypass storage volume 162 that is in flow communication with first charge bypass storage volume 158 through the first charge bypass flow path 160. First charge bypass flow path 160 parallels longitudinal axis 106 and extends upstream from first bypass storage volume 158 to second bypass storage volume 162.

Second charge bypass storage volume 162 opens into flow passage 104 through a second charge bypass flow path 164. In the illustrated embodiment, second charge bypass flow path 164 extends in the downstream direction at an angle A2 with respect to longitudinal axis 106.

In one embodiment, the cooperative arrangement between body portions 118, 120 is formed by overlapping parts of body portions 118, 120. For example, referring to FIG. 5 specifically, downstream body portion 120 includes an outer axial wall part 120a that includes flange 134 and a downstream end flange 135. Downstream body portion 120 also includes a radially inwardly extending wall part 120b and an axially extending wall part 120c spaced radially inwardly from outer axial wall part 120a. Middle body portion 118 includes a second radial wall part 118d that cooperates with axial outer wall part 120a, radially inwardly extending wall part 120b and axially extending wall part 120c to form first charge bypass storage volume 158. Second radial wall 118d and axially extending wall part 120c form first charge bypass flow path 160 therebetween. In addition, axially extending wall part 120c cooperates with axial wall part 118b to define second charge bypass flow path 164, and further cooperates with first and second radial walls 118c 118d to form second charge bypass storage volume 162.

Referring back to FIGS. 2-5, in one embodiment, angles A1 and A2 form an entry angle of about 30 degrees relative to longitudinal axis 106 for each of the second fuel flow path 154 and the second charge bypass flow path 164. Other angles ranging from 10 degrees to 90 degrees are also contemplated. When the entry angle A1, A2 is oriented in the direction of flow as shown in the illustrated embodiments, entry angles A1, A2 facilitate the delivery of the respective fuel flow 36 and the charge bypass flow 32 into fresh air flow 24.

The second flow paths 154, 164 each extend circumferentially around the flow passage 104 to distribute the fuel flow 36 and the charge bypass flow 32 around flow passage 104. In addition, storage volumes 148, 152, 158 and 162 each extend circumferentially around the flow passage 104 to distribute the fuel flow 36 and the charge bypass flow 32 from the respective second flow paths 154, 164 circumferentially into the flow passage 104.

Introducer 100 can be made from any suitable material. In one embodiment, the body portions 116, 118, 120 are made from cast aluminum alloy or cast iron alloy and machined to provide the desired interfaces to form the storage volumes and flow paths described above. In addition, upstream body portion 116 can include a sensor mount 166 to receive a sensor configured to sense incoming air quality such as pressure, temperature and humidity upstream of compressor 20.

The duel chamber storage volumes 148, 152 and 158, 162 for each of the fuel flow 36 and the charge bypass flow 32 along with the dual flow paths 150, 154 and 160, 164 allow the storage and constant availability of fuel and charge flow bypass gases for controlled delivery to flow passage 104. The quantity of available fuel and charge bypass gases can be controlled by an engine controller (not shown) that is configured to operate actuators associated with fuel control valve 44 and charge bypass control valve 60. The upstream storage volumes 148, 158 dampen the fluid flow turbulences, and the fluid thereafter enters the downstream storage volumes 152, 162 the fluid flow paths 150, 160 that are controlled in size to provide the desire rate of fluid flow therethrough.

Figure 5:
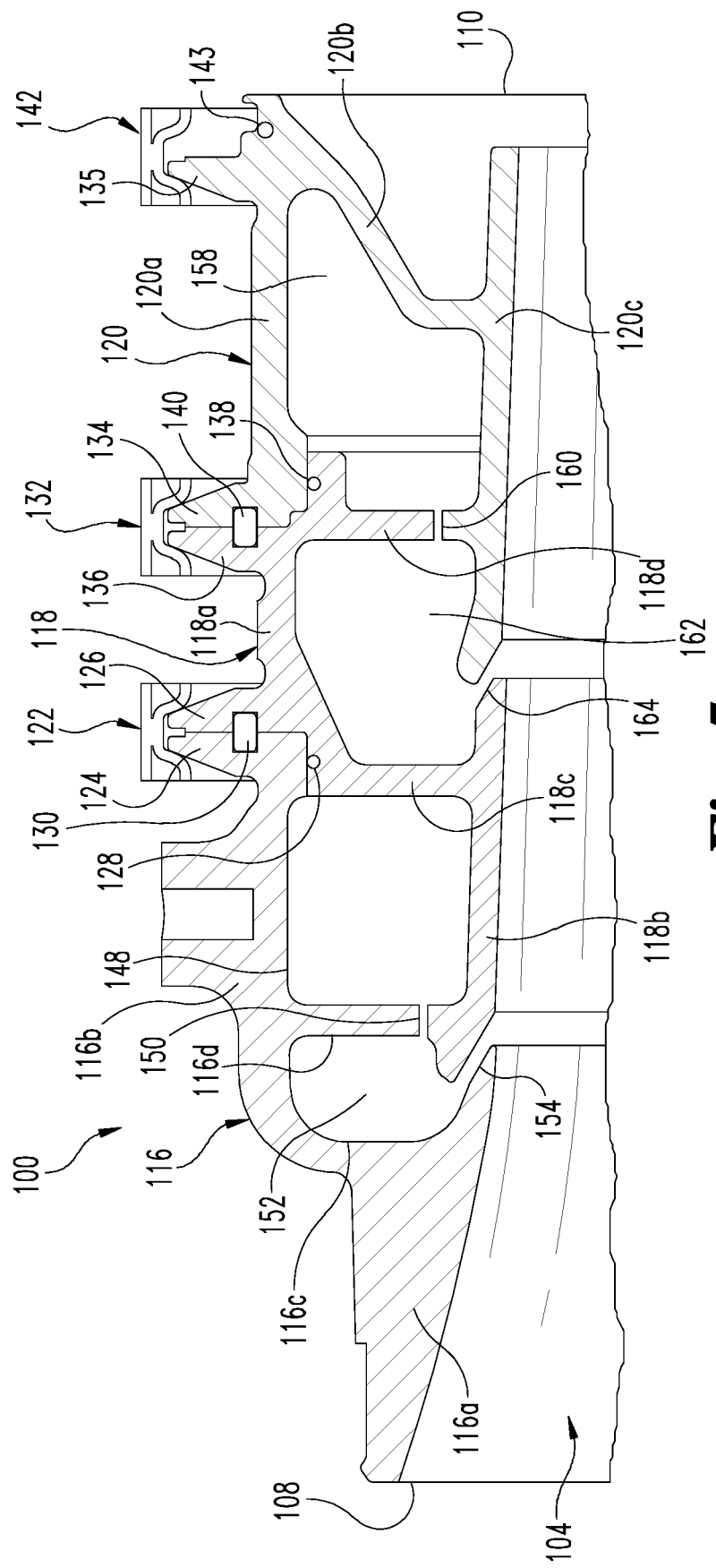
FIG. 5 is an enlarged section view of FIG. 4 showing a part of the introducer along the intake airflow axis.

Referring to FIG. 5 of the illustrated embodiment, first fuel storage volume 148 is greater than second fuel storage volume 152. In addition, first charge flow bypass storage volume 158 is greater than the second charge flow bypass storage volume 162. The larger fuel storage volumes allow the buffering of fuel and charge bypass flows into the flow passage 104 for better mixing and/or for maintaining the desired flow paths of fluids along the introducer 100.

Figure 6A:
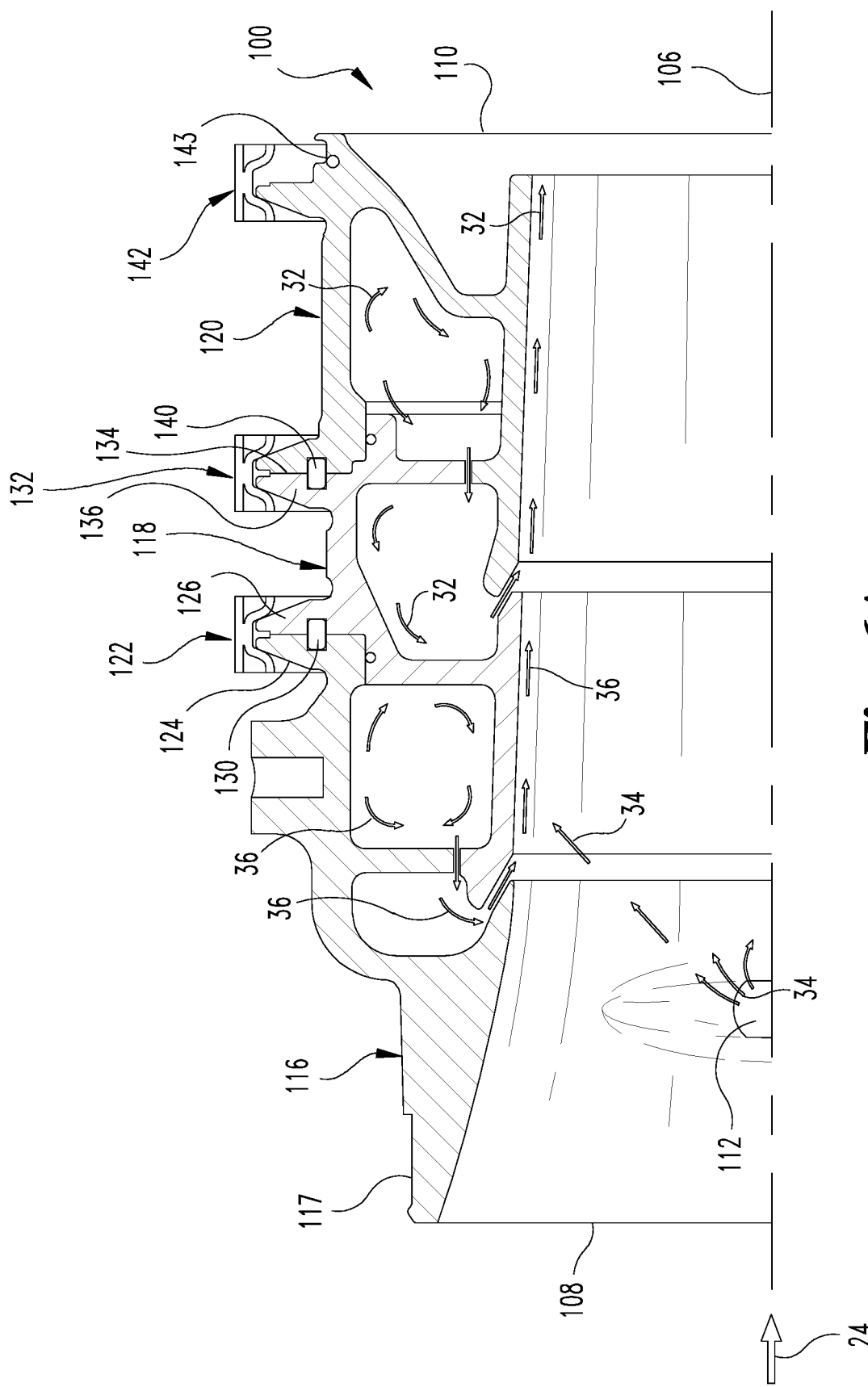
FIGS. 6A and 6B are diagrams showing the mass fraction flow paths for the introducer.
Figure 6B:
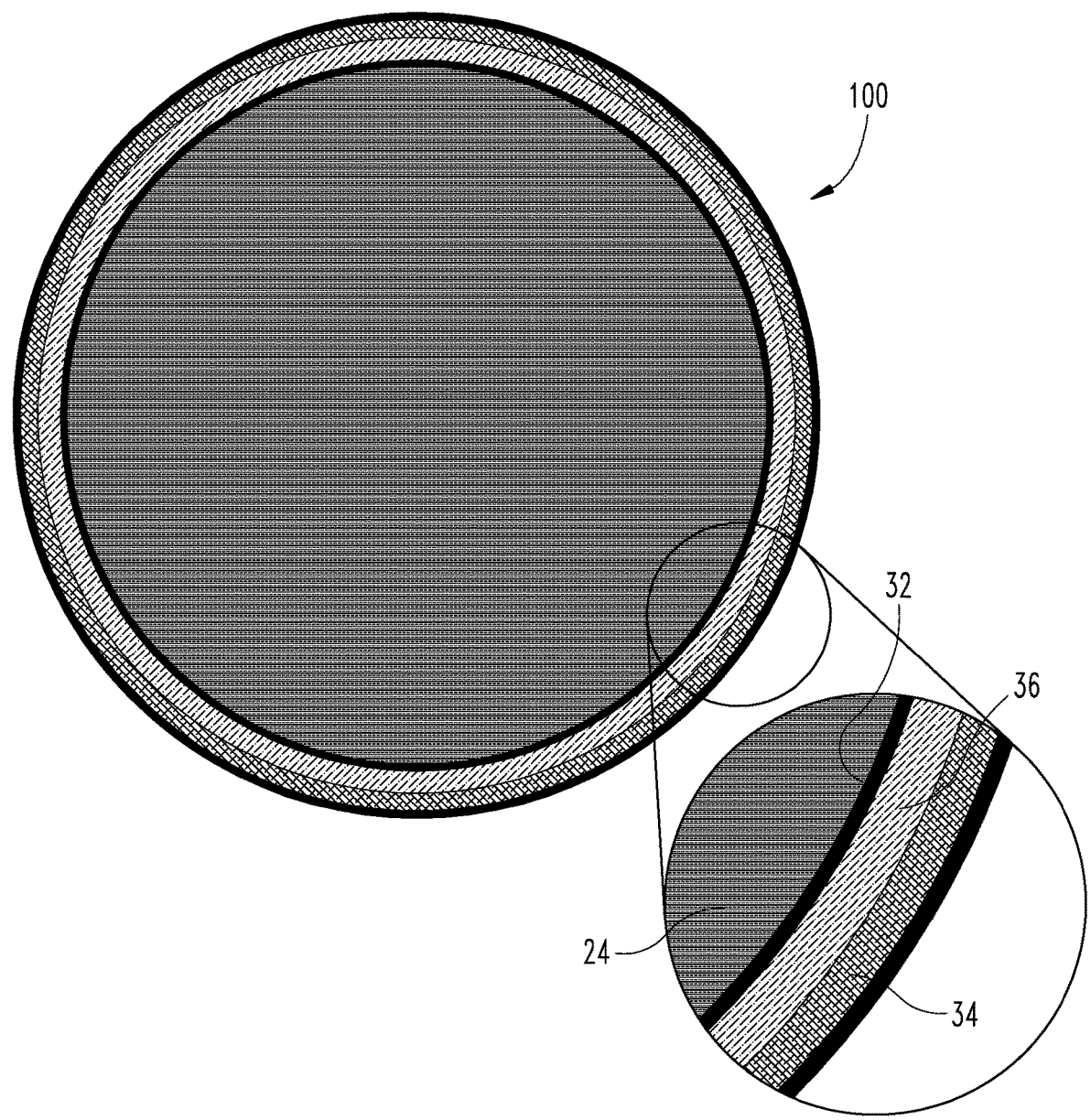

Referring to FIGS. 6A and 6B, there is shown mass fraction flow paths and a cross-section of a mass fraction plot of the various flows in introducer 100 before entry into the compressor source. As shown in FIG. 6A, the fuel flow 36 and charge bypass flow 32 are buffered in their respective first temporary storage volumes 148, 158 and then provided to the respective downstream (relative to the direction of fresh airflow 24) second, smaller storage volumes 152, 162 through axial flow paths 150, 160. Meanwhile, CCV flow 34 is provided directly into the axial flow passage 104 and fuel flow 36 and charge bypass flow 32 are provided into the axial flow passage 104 through the respective angled flow paths 154, 164.

As shown in FIG. 6B, an example mass fraction plot shows that the fresh airflow 24 occupies the center of flow passage 104 while the CCV flow 34, fuel flow 36 and charge bypass flow 32 are stratified or layered around fresh airflow 24 due to the different densities of the various fluids. Since introducer 100 maintains components of the charge flow at predetermined cross-sectional peripheral areas in the introducer, compressor wheel stresses caused by a density of a mixed charge flow are avoided and the compressor acts as a mixer of the charge flow components.

As evident from the drawings and description provided herein, various aspects of the disclosure are contemplated. According to one aspect, there is disclosed a method that includes: receiving a fresh airflow in a flow passage of an introducer upstream of an intake of an internal combustion engine system; receiving crankcase ventilation gases from the internal combustion engine into the flow passage of the introducer; receiving a fuel flow into the flow passage of the introducer; receiving a charge bypass flow into the flow passage of the introducer; delivering the fresh airflow, the crankcase ventilation gases, the fuel flow, and the charge bypass flow from the introducer to provide a charge flow; and pressurizing the charge flow downstream of the introducer, wherein the charge bypass flow is a returned portion of the pressurized charge flow.

In one embodiment of the method, the charge flow is pressurized by a compressor of a turbocharger and/or cooled by a charge air cooler. In another embodiment, the method includes temporarily storing the fuel flow in first and second fuel storage volumes defined by the introducer before receiving the fuel flow into the flow passage of the introducer. In yet another embodiment, the method includes temporarily storing the charge bypass flow in first and second charge bypass storage volumes defined by the introducer before receiving the charge bypass flow into the flow passage of the introducer.

According to another aspect, a system includes a pressure source including an inlet and an outlet. The pressure source is operable to pressurize at least a portion of a charge flow received by the pressure source through the inlet and to provide the pressurized portion of the charge flow to the outlet. The system further includes an introducer mounted upstream of the inlet that includes a flow passage for receiving a fresh airflow. The introducer includes a first inlet for receiving crankcase ventilation gases from an internal combustion engine that provides the crankcase ventilation gases into the flow passage of the introducer. The introducer includes a second inlet for receiving a fuel flow that provides the fuel flow into the flow passage of the introducer. The introducer also includes a third inlet for receiving a charge bypass flow and providing the charge bypass flow into the flow passage of the introducer. The introducer is configured to mix the fresh airflow, the crankcase ventilation gases, the fuel flow, and the charge bypass flow to provide the charge flow for pressurization by the pressure source.

In one embodiment, the introducer defines first and second fuel storage volumes around the flow passage and the first and second storage volumes are flow connected by a first fuel flow path. In a refinement of this embodiment, the first fuel storage volume is connected to the second inlet, the first and second fuel storage volumes are connected by the first fuel flow path around the flow passage, and the second fuel storage volume is connected to the flow passage with a second fuel flow path that extends around the flow passage. In a further refinement, the flow passage extends along a longitudinal axis and the second fuel flow path extends in a downstream direction at an angle of 30 degrees relative to the longitudinal axis. In another refinement, the first fuel storage volume is greater than the second fuel storage volume.

In another embodiment, the introducer defines first and second charge bypass storage volumes around the flow passage and the first and second charge bypass storage volumes are flow connected by a first charge bypass flow path. In a refinement of this embodiment, the first charge bypass storage volume is connected to the third inlet, the first and second charge bypass storage volumes are connected by the first charge bypass flow path around the flow passage, and the second charge bypass storage volume is connected to the flow passage with a second charge bypass flow path. In a further refinement, the flow passage extends along a longitudinal axis and the second charge bypass flow path extends in a downstream direction at an angle of 30 degrees relative to the longitudinal axis. In another refinement, the second charge bypass flow path extends in a downstream direction at an angle ranging from 0 degrees to 90 degrees relative to the longitudinal axis. In another refinement, the first charge bypass storage volume is greater than the second charge bypass storage volume.

In another embodiment, the introducer includes an upstream cylindrical body portion, a middle cylindrical body portion, and a downstream cylindrical body portion that are joined to one another in end-to-end relation. The first and second inlets are provided on the upstream cylindrical body portion and the third inlet is provided on the downstream cylindrical body portion. In a refinement of this embodiment, the upstream cylindrical body portion and the middle cylindrical body portion are cooperatively engaged to define a first fuel storage volume connected to the second inlet, a second fuel storage volume connected to the first fuel storage volume by a first fuel flow path, and a second fuel flow path connecting the second storage volume with the flow passage. In addition, the middle cylindrical body portion and the downstream cylindrical body portion are cooperatively engaged to define a first charge bypass storage volume connected to the third inlet, a second charge bypass storage volume, and a first charge bypass flow path connecting the first charge bypass storage volume and the second charge bypass storage volume.

In another embodiment, relative to a direction of flow through the flow passage of the introducer, the first fuel storage volume is located downstream of the second fuel storage volume and the first charge bypass storage volume is downstream of the second charge bypass storage volume. Other embodiments contemplate an opposite arrangement, and any order of connection in the downstream direction of the first, second and third inlets along the introducer.

According to another aspect, an apparatus for introducing a charge flow to an internal combustion engine is provided. The introducer includes an axial flow passage and a first inlet in flow communication with the axial flow passage to provide a flow of crankcase ventilation gases to the flow passage. The introducer further includes a second inlet in flow communication with the flow passage to provide a flow of fuel to the flow passage. The introducer further includes a third inlet in flow communication with the flow passage to provide a charge bypass flow to the flow passage.

In one embodiment of the apparatus, each of the second and third inlets is connected to the flow passage through first and second storage volumes between the respective inlet and the flow passage. The second and third inlets are flow connected to respective ones of the first storage volumes, and a first flow path is provided between the respective first and second storage volumes and a second flow path is provided between the flow passage and the respective second storage volume.

In a refinement of this embodiment, each of the first flow paths extends axially in an upstream direction between the respective first and second storage volumes in parallel relation with a longitudinal axis of the flow passage, and each of the second flow paths extends in the downstream direction at an angle relative to the longitudinal axis. In a further refinement, the introducer includes axially abutting upstream, middle and downstream cylindrical body portions that cooperatively engage one another to define the respective first and second storage volumes and the first and second flow paths.

In another embodiment, the introducer includes dowel pin sets to align and orient the abutting upstream, middle and downstream cylindrical body portions relative to one another. In another embodiment, at least one sensor mount is provided on at least one of the upstream, middle and downstream cylindrical body portions of the introducer. In still another embodiment, the axial flow passage is defined by a bell mouth shape at an upstream end of the introducer. In still another embodiment, the introducer is configured for the crankcase ventilation gases, the fuel flow, and the charge bypass flow to be arranged in layer around a fresh airflow for introduction into a pressure source upstream of the internal combustion engine.

While the invention has been illustrated and described in detail in the drawings and foregoing description, the same is to be considered as illustrative and not restrictive in character, it being understood that only certain exemplary embodiments have been shown and described and that all changes and modifications that come within the spirit of the inventions are desired to be protected. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A method, comprising:
   receiving a fresh airflow in a flow passage of an introducer including a body defining the flow passage, the body mounted upstream of an intake of an internal combustion engine system;
   receiving crankcase ventilation gases from the internal combustion engine into the flow passage at the body of the introducer through a first inlet of the introducer;
   receiving a fuel flow into the flow passage at the body of the introducer through a second inlet of the introducer;
   receiving a charge bypass flow into the flow passage at the body of the introducer through a third inlet of the introducer;
   delivering the fresh airflow, the crankcase ventilation gases, the fuel flow, and the charge bypass flow from the introducer to provide a charge flow; and
   pressurizing the charge flow downstream of the introducer, wherein the charge bypass flow is a returned portion of the pressurized charge flow.

2. The method of claim 1, wherein the charge flow is pressurized by a compressor of a turbocharger.

3. The method of claim 2, wherein the charge flow is cooled by a charge air cooler.

4. The method of claim 1, further comprising temporarily storing the fuel flow in first and second fuel storage volumes defined by the introducer before receiving the fuel flow into the flow passage of the introducer.

5. The method of claim 4, further comprising temporarily storing the charge bypass flow in the first and second charge bypass storage volumes defined by the introducer before receiving the charge bypass flow into the flow passage of the introducer.

6. The method of claim 1, further comprising temporarily storing the charge bypass flow in first and second charge bypass storage volumes defined by the introducer before receiving the charge bypass flow into the flow passage of the introducer.

7. A system, comprising:
   a pressure source including an inlet and an outlet, the pressure source operable to pressurize at least a portion of a charge flow received by the pressure source through the inlet and to provide the pressurized portion of the charge flow to the outlet; and
   an introducer mounted upstream of the inlet that includes a body defining a flow passage configured to receive a fresh airflow, the body of the introducer including:
      a first inlet configured to receive crankcase ventilation gases from an internal combustion engine and provide the crankcase ventilation gases into the flow passage of the introducer;
      a second inlet configured to receive a fuel flow and provide the fuel flow into the flow passage of the introducer; and
      a third inlet configured to receive a charge bypass flow and provide the charge bypass flow into the flow passage of the introducer, wherein the introducer is configured to deliver the fresh airflow, the crankcase ventilation gases, the fuel flow, and the charge bypass flow to provide the charge flow for pressurization by the pressure source.

8. The system of claim 7, wherein the introducer defines first and second fuel storage volumes around the flow passage and the first and second storage volumes are flow connected by a first fuel flow path.

9. The system of claim 8, wherein the first fuel storage volume is connected to the second inlet, the first and second fuel storage volumes are connected by the first fuel flow path around the flow passage, and the second fuel storage volume is connected to the flow passage with a second fuel flow path that extends around the flow passage.

10. The system of claim 9, wherein the flow passage extends along a longitudinal axis and the second fuel flow path extends in a downstream direction at an angle of 30 degrees relative to the longitudinal axis.

11. The system of claim 9, wherein the flow passage extends along a longitudinal axis and the second fuel flow path extends in a downstream direction at an angle ranging from 0 degrees to 90 degrees relative to the longitudinal axis.

12. The system of claim 9, wherein the first fuel storage volume is greater than the second fuel storage volume.

13. The system of claim 7, wherein the introducer defines first and second charge bypass storage volumes around the flow passage and the first and second charge bypass storage volumes are flow connected by a first charge bypass flow path.

14. The system of claim 13, wherein the first charge bypass storage volume is connected to the third inlet, the first and second charge bypass storage volumes are connected by the first charge bypass flow path around the flow passage, and the second charge bypass storage volume is connected to the flow passage with a second charge bypass flow path.

15. The system of claim 14, wherein the flow passage extends along a longitudinal axis and the second charge bypass flow path extends in a downstream direction at an angle of 30 degrees relative to the longitudinal axis.

16. The system of claim 14, wherein the first charge bypass storage volume is greater than the second charge bypass storage volume.

17. The system of claim 7, wherein the introducer includes an upstream cylindrical body portion, a middle cylindrical body portion, and a downstream cylindrical body portion that are joined to one another in end-to-end relation, and the first and second inlets are provided on the upstream cylindrical body portion and the third inlet is provided on the downstream cylindrical body portion.

18. The system of claim 17, wherein:
the upstream cylindrical body portion and the middle cylindrical body portion are cooperatively engaged to define a first fuel storage volume connected to the second inlet, a second fuel storage volume connected to the first fuel storage volume by a first fuel flow path, and a second fuel flow path connecting the second storage volume with the flow passage; and
the middle cylindrical body portion and the downstream cylindrical body portion are cooperatively engaged to define a first charge bypass storage volume connected to the third inlet, a second charge bypass storage volume, and a first charge bypass flow path connecting the first charge bypass storage volume and the second charge bypass storage volume.

19. The system of claim 18, wherein relative to a direction of flow through the flow passage of the introducer, the first fuel storage volume is located downstream of the second fuel storage volume and the first charge bypass storage volume is downstream of the second charge bypass storage volume.

20. An apparatus for introducing a charge flow upstream of an internal combustion engine, comprising:
an introducer mounted upstream of the engine, including a body defining an axial flow passage configured to receive a fresh airflow, and the body including a first inlet in flow communication with the axial flow passage configured to provide a flow of crankcase ventilation gases to the flow passage, the body of the introducer further including a second inlet in flow communication with the flow passage configured to provide a flow of fuel to the flow passage, and the body of the introducer further including a third inlet in flow communication with the flow passage configured to provide a charge bypass flow to the flow passage.

21. The apparatus of claim 20, wherein each of the second and third inlets is connected to the flow passage through first and second storage volumes between the respective inlet and the flow passage, wherein the second and third inlets are flow connected to respective ones of the first storage volumes, and wherein a first flow path is provided between the respective first and second storage volumes and a second flow path is provided between the flow passage and the respective second storage volume.

22. The apparatus of claim 21, wherein each of the first flow paths extends axially in an upstream direction between the respective first and second storage volumes in parallel relation with a longitudinal axis of the flow passage, and further wherein each of the second flow paths extends in the downstream direction at an angle relative to the longitudinal axis.

23. The apparatus of claim 22, wherein the introducer includes axially abutting upstream, middle and downstream cylindrical body portions that cooperatively engage one another to define the respective first and second storage volumes and the first and second flow paths.

24. The apparatus of claim 23, wherein the introducer includes dowel pin sets to align and orient the abutting upstream, middle and downstream cylindrical body portions relative to one another.

25. The apparatus of claim 23, further comprising at least one sensor mount on at least one of the upstream, middle and downstream cylindrical body portions of the introducer.

26. The apparatus of claim 20, wherein the axial flow passage is defined by a bell mouth shape at an upstream end of the introducer.

27. The apparatus of claim 20, wherein the introducer is configured for the crankcase ventilation gases, the fuel flow, and the charge bypass flow to be arranged in layers according to fluid density around a fresh airflow for introduction into and mixing by a pressure source upstream of the internal combustion engine.

* * * * *